UNITED STATES PATENT OFFICE.

EMILE A. FOURNEAUX, OF NEW YORK, N. Y., ASSIGNOR TO HERMAN A. METZ, OF NEW YORK, N. Y.

PROCESS OF MAKING BASIC ZINC FORMALDEHYDE HYDROSULFITE, (S.)

No. 814,032.  Specification of Letters Patent.  Patented March 6, 1906.

Application filed July 14, 1905. Serial No. 269,721.

*To all whom it may concern:*

Be it known that I, EMILE A. FOURNEAUX, a citizen of the United States, residing at 122 Hudson street, New York, in the county of New York and State of New York, have invented certain new and useful Improvements in Processes of Making Basic Zinc Formaldehyde Hydrosulfite, (S,) of which the following is a specification.

In my application, Serial No. 252,867, filed March 30, 1905, I have described and claimed a basic zinc formaldehyde hydrosulfite (S) believed to correspond to the formula $$ZnSO_2.CH_2O.H_2O,$$

occurring as a white crystalline precipitate. This compound is relatively stable, being capable of drying without decomposition upon the water-bath in open air, and possesses a high reducing power, one part being able to reduce about one and one-half parts of pure indigo in the form of indigo sulfonic acid. In said application I have also described and claimed a process of making this basic zinc compound, said process consisting in treating zinc hydrosulfite with formaldehyde and a suitable alkaline compound, as sodium carbonate, the basic zinc salt being apparently formed in accordance with the equation:

$$2ZnS_2O_4 + 4CH_2O + Na_2CO_3 + 3H_2O = 2ZnSO_2.CH_2O.H_2O + 2NaHSO_3.CH_2O + CO_2.$$

In my application, Serial No. 259,469, filed May 8, 1905, I have described and claimed another process by which the above-described zinc compound may be produced, said process consisting, essentially, in mixing an alkali formaldehyde bisulfite with zinc and supplying a suitable acid at such rate that the presence of free acid is substantially avoided, an example of the process being expressed by the following equation:

$$NaHSO_3.CH_2O + Zn + HCl = NaCl + ZnSO_2.CH_2O.H_2O.$$

In the first of the processes above referred to the basic zinc salt is accompanied by an alkali formaldehyde bisulfite, which remains in the mother-liquor as an expensive by-product having no commercial value. In the second process the sole by-product is the relatively inexpensive alkali salt of the acid employed. I have now discovered that this basic zinc formaldehyde hydrosulfite (S) can be produced in a state of substantial purity and unaccompanied by any by-product by reducing an aqueous solution containing sulfurous acid and formaldehyde, preferably in equimolecular amounts with zinc-dust, the reaction probably occurring in accordance with the equation:

$$Zn + SO_2 + CH_2O + H_2O = ZnSO_2.CH_2O.H_2O.$$

The following conditions have been found to give satisfactory results: To a concentrated solution containing one molecular proportion of sulfurous acid and one molecular proportion of formaldehyde add a little more than one molecular proportion of zinc-dust, then heat to a temperature exceeding 70° centigrade, and preferably almost to boiling, while stirring constantly. The insoluble basic zinc formaldehyde hydrosulfite (S) separates in crystalline form. When the reaction is terminated, it is filtered, washed, and dried.

Instead of acting with zinc-dust upon a solution containing sulfurous acid and formaldehyde it is also feasible to act with two molecular proportions of sulfurous acid upon one molecular proportion of zinc-dust in aqueous suspension, thus producing zinc hydrosulfite, $(ZnS_2O_4,)$ then add two molecular proportions of formaldehyde, then after the reaction has taken place one molecular proportion of zinc-dust, and heat while constantly stirring, as described above.

I claim—

1. The process of making basic zinc formaldehyde hydrosulfite (S) which consists in reacting with zinc on sulfurous acid and formaldehyde in solution; substantially as described.

2. The process of making basic zinc formaldehyde hydrosulfite (S) which consists in reacting with two molecular proportions of sulfurous acid on one molecular proportion of zinc, adding two molecular proportions of formaldehyde, and reducing the resulting solution with one molecular proportion of zinc; substantially as described.

In testimony whereof I affix my signature in presence of two witnesses.

EMILE A. FOURNEAUX.

Witnesses:
　H. S. NEIMAN,
　ALEXANDER SCHWARSMAN.